(12) United States Patent
Prorock et al.

(10) Patent No.: US 8,438,131 B2
(45) Date of Patent: May 7, 2013

(54) SYNCHRONIZATION OF MEDIA RESOURCES IN A MEDIA ARCHIVE

(75) Inventors: Michael F. Prorock, Raleigh, NC (US); Thomas J. Prorock, Raleigh, NC (US)

(73) Assignee: Altus365, Inc., Campbell, CA (US)

( * ) Notice: Subject to any disclaimer, the term of this patent is extended or adjusted under 35 U.S.C. 154(b) by 142 days.

(21) Appl. No.: 12/775,064

(22) Filed: May 6, 2010

(65) Prior Publication Data

US 2011/0113011 A1    May 12, 2011

Related U.S. Application Data

(60) Provisional application No. 61/259,029, filed on Nov. 6, 2009, provisional application No. 61/264,595, filed on Nov. 25, 2009.

(51) Int. Cl.
*G06F 7/00* (2006.01)
*G06F 17/00* (2006.01)

(52) U.S. Cl.
USPC .......................................................... 707/634

(58) Field of Classification Search .................. None
See application file for complete search history.

(56) References Cited

U.S. PATENT DOCUMENTS

| | | | |
|---|---|---|---|
| 5,661,665 A | 8/1997 | Glass et al. | |
| 6,105,055 A | 8/2000 | Pizano et al. | |
| 6,321,252 B1 | 11/2001 | Bhola et al. | |
| 6,507,875 B1 | 1/2003 | Mellen-Garnett et al. | |
| 7,051,275 B2 | 5/2006 | Gupta et al. | |
| 7,062,712 B2 | 6/2006 | Schneider et al. | |
| 7,117,231 B2 | 10/2006 | Fischer et al. | |
| 7,162,690 B2 | 1/2007 | Gupta et al. | |
| 7,487,086 B2 | 2/2009 | Griggs | |
| 7,499,046 B1 | 3/2009 | Wright et al. | |
| 7,631,015 B2 | 12/2009 | Gupta et al. | |
| 2002/0059342 A1 | 5/2002 | Gupta et al. | |
| 2002/0112004 A1 | 8/2002 | Reid et al. | |
| 2003/0196164 A1 | 10/2003 | Gupta et al. | |
| 2004/0039464 A1 | 2/2004 | Virolainen et al. | |
| 2004/0221323 A1 | 11/2004 | Watt | |
| 2004/0260714 A1 | 12/2004 | Chatterjee et al. | |
| 2005/0125717 A1 | 6/2005 | Segal et al. | |
| 2005/0165840 A1 * | 7/2005 | Pratt et al. | 707/104.1 |
| 2006/0161621 A1 | 7/2006 | Rosenberg | |
| 2006/0190250 A1 | 8/2006 | Saindon et al. | |
| 2007/0011012 A1 | 1/2007 | Yurick et al. | |
| 2007/0083540 A1 | 4/2007 | Gundla et al. | |
| 2007/0100904 A1 * | 5/2007 | Casey et al. | 707/201 |
| 2007/0118794 A1 | 5/2007 | Hollander et al. | |
| 2007/0160972 A1 | 7/2007 | Clark | |
| 2008/0040151 A1 | 2/2008 | Moore | |
| 2008/0144725 A1 * | 6/2008 | Henocq et al. | 375/240.27 |

(Continued)

*Primary Examiner* — Cheryl Lewis
*Assistant Examiner* — Raheem Hoffler
(74) *Attorney, Agent, or Firm* — Fenwick & West LLP

(57) ABSTRACT

A media archive comprising a plurality of media resources associated with events that occurred during a time interval are processed to synchronize the media resources. Sequences of patterns are identified in each media resource of the media archive. Elements of the sequences associated with different media resources are correlated such that a set of correlated elements is associated with the same event that occurred in the given time interval. The synchronization information of the processed media resources is represented in a flexible and extensible data format. The synchronization information is used for optimized synchronous search capability, for enhanced synchronous playback of the archive resources, and for unified access to, and modification of, the archive resources.

23 Claims, 9 Drawing Sheets

U.S. PATENT DOCUMENTS

| | | |
|---|---|---|
| 2008/0276159 A1 | 11/2008 | Narayanaswami et al. |
| 2009/0132583 A1 | 5/2009 | Carter et al. |
| 2009/0138508 A1 | 5/2009 | Tolle et al. |
| 2009/0154893 A1 | 6/2009 | Vasudevan et al. |
| 2009/0193345 A1 | 7/2009 | Wensley et al. |
| 2009/0279530 A1* | 11/2009 | El Kolli et al. ................. 370/350 |
| 2009/0316872 A1 | 12/2009 | Wolf et al. |
| 2009/0319482 A1 | 12/2009 | Norlander et al. |
| 2010/0017474 A1 | 1/2010 | Kandekar et al. |
| 2010/0039296 A1 | 2/2010 | Marggraff et al. |
| 2010/0100805 A1 | 4/2010 | Williams et al. |
| 2010/0169906 A1 | 7/2010 | Takahashi |
| 2010/0268534 A1 | 10/2010 | Kishan Thambiratnam et al. |
| 2010/0318520 A1 | 12/2010 | Loeb et al. |
| 2011/0035323 A1 | 2/2011 | Hamilton et al. |
| 2011/0069230 A1* | 3/2011 | Polumbus et al. ............ 348/468 |

* cited by examiner

SYNCHRONIZATION OF MEDIA RESOURCES IN A MEDIA ARCHIVE

CROSS REFERENCES TO RELATED APPLICATIONS

This application claims the benefit of U.S. Provisional Application No. 61/259,029, filed Nov. 6, 2009, and U.S. Provisional Application No. 61/264,595, filed Nov. 25, 2009 each of which is incorporated by reference in its entirety.

BACKGROUND

1. Field of Art

The disclosure generally relates to the field of processing media archive resources, and more specifically, to programmatically processing media archives for synchronous search and synchronous playback of media archive resources, and for the unified access to, and modification of, the media archive resources.

2. Description of the Field of Art

The production of audio and video has resulted in many different formats and standards in which to store and/or transmit the audio and video media. The media industry has further developed to encompass other unique types of media production such as teleconferencing, web conferencing, video conferencing, podcasts, other proprietary forms of innovative collaborative conferencing, various forms of collaborative learning systems, and the like. When recorded, for later playback or for archival purposes, all of these forms of media are digitized and archived on some form of storage medium.

The numerous different proprietary archive formats has created interoperability problems throughout the industry. The impact of these interoperability issues range from the software solutions and services industry to the content delivery and streaming media solutions industry. The problem in the industry is further exacerbated because of a proliferation of numerous new and emerging web conferencing, teleconferencing, and video conferencing solutions. During these types of collaborative conferencing sessions, every event (e.g., audio, video, graphics, screen sharing sessions, online chat, slide presentation, etc.) that occurs during a web conference is captured and (optionally) archived for later playback.

Each collaborative conferencing solution has its own proprietary format for archiving all of the various types of events that transpire during the conference session. Each of the numerous conferencing solutions has a way to playback their own archives, but many of these proprietary playback solutions contain deficiencies and are incomplete. There is lacking, inter alia, detection and interpretation of the contents of these various distinct proprietary formats.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
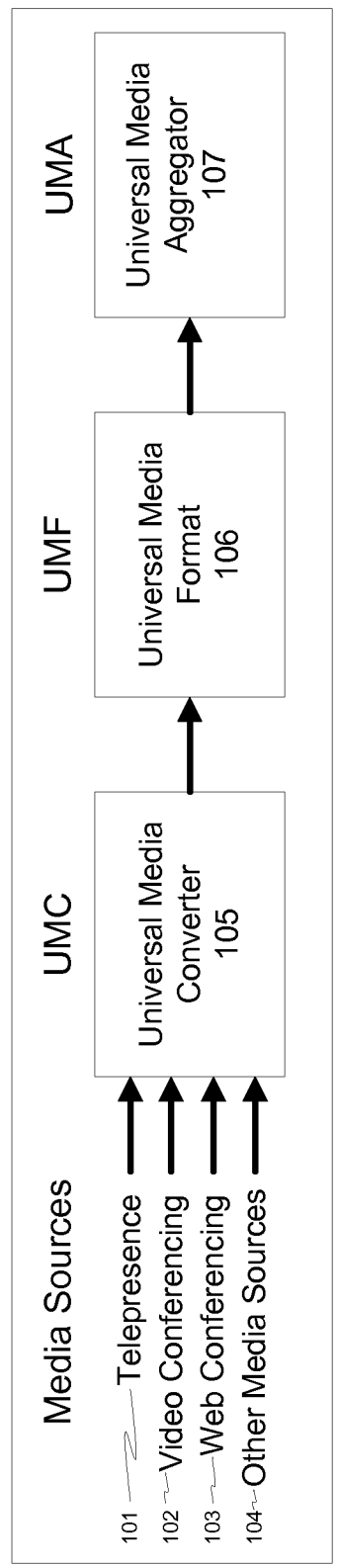
FIG. 1 is an embodiment of the components of the system illustrating their interactions.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A disclosed system and framework processes the contents of media archives. Detailed descriptions are provided for the new and inventive ways to detect and make use of the media archive contents in addition to the new and useful ways in which the representation of the media resources is constructed and presented for ease of programmatic interfacing. The systems and methods disclosed are best understood by referring to the drawings and flowcharts that are included in the figures to accompany the following textual description.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An embodiment of a disclosed system (and method) unifies the processing of media archive resources. For example, a system accepts input from multiple media archive sources and then detects and interprets the contents from the media archive. The resulting processed media resources are then represented in a flexible and extensible data format. The process of detecting and interpreting the media resources preserves all of the synchronous aspects as captured in the original media archive. All of the processed media resources that have been converted to the new flexible and extensible data format are then aggregated into an encompassing unifying system which provides for ease of access to the converted media resources via common application programming interfaces.

In one embodiment, a system and framework for processing media archive resources comprises the following components: the universal media converter (UMC), the universal media format (UMF), and the universal media aggregator (UMA). The UMC accepts media archives as input, detects and interprets the contents of the archive, and processes the contents of the media archive. A media archive can comprise a collection of digitized components from a recorded media event that includes media/multimedia presentation, teleconference, recorded video conference, recorded video via camcorders (e.g., FLIP video), podcast, other forms of broadcast media (e.g., television (TV), closed circuit television (CCTV)), etc. The collection of digitized components may be in compressed or uncompressed form and may be in a standardized format or a proprietary format. The media archive may be digitally stored in a single file, or may be represented in a data stream transmitted over a network, or the individual components may be loosely coupled (e.g., interact with each other over network) and reside in different storage locations and then aggregated into a single cohesive media archive at processing time. Examples of digitized components may be a combination of any or all, but not limited to audio, video, MICROSOFT POWERPOINT presentation, screen sharing, chat window sharing, webcam, question and answer (Q&A) window, textual transcript, transcripted words with timings for the transcripted spoken words, background music (e.g., alternate audio tracks), etc. The media archive resources (or media resources) are digitized components that are part of the media archive. The media resources may be associated with data captured via a webcam, audio recording devices, video recording devices, etc. Examples of media resources include, screen sharing resources, POWERPOINT slides, transcripts, questions and answers, user notes, list of attendees, etc. The media resource may reside in a media file, a data stream or other means of storing/archiving computer information or data. The information stored may be associated with one or more events, for example, conferences, meetings, conversations, screen sharing sessions, online chat sessions, interactions on online forums and the like. The UMC also produces a representation of the media archive resources in the UMF. The synchronization between all media archive resources is preserved and/or enhanced during the UMC processing and subsequent creation of the UMF.

The UMF is a representation of content from a media archive as well as any extended or related resources. The format is flexible as new resources can be added to the contents of the UMF and existing resources can be modified. The UMF is extendable and supports proprietary extensions. The UMF facilitates the ease of access to the components from a media archive.

The UMA is the encompassing system that supports and controls processing of the requests for media archive extractions, media archive conversions, UMF generation, playback of recorded conferences/presentations/meetings, and the like.

The UMF beneficially interfaces with a proliferation of proprietary media archive formats and serves as a simplified integrating layer to the complexities of the various media archive formats. The UMC beneficially determines media archive formats, autonomously corrects errors in media archive resources, and controls the scheduling of the processing steps required to extract resources from the media archive and synchronously represent these interrelated resources when creating the UMF. Once the UMF data and structures are created, they are aggregated in the UMA. The UMA provides a common means of interacting with a selected UMF. Enhanced synchronized search capability and synchronous playback of all detected and newly added media resources is possible since UMC preserves and/or enhances the synchronization of the media resources. The function of each of these above mentioned system components is described in further detail in the following sections.

System Architecture

Turning now to FIG. (FIG. 1, it illustrates the interactions of the components of the system used to process media archives. In particularly, in one embodiment the systems components are the universal media converter ('UMC'), the universal media format ('UMF'), and the universal media aggregator ('UMA') introduced previously.

As shown in FIG. 1, the UMC accepts (or receives) input from different media sources 101-104. The depicted, and other new and emerging, types of media sources are possible because of a convergence of available technologies, such as voice, audio, video, data, and various other forms of internet related collaborative technologies email, chat, and the like.

Representative examples of the telepresence media sources 101 include CISCO TELEPRESENCE, HP HALO, and telepresence product offerings from TANDBERG. Likewise, there are other well known industry solutions for video conferencing 102 and web conferencing 103. The UMC 105 is adaptable to support new forms of other media sources 104 that are available in the industry or can emerge in the future.

The UMC 105 detects and interprets the contents of the various media sources 101, 102, 103, and 104. The resulting output from the UMC 105 interrogation, detection, and interpretation of the media sources 101, 102, 103, and 104 is a unifying media resource, namely the UMF 106.

The UMF 106 is a representation of the contents from a media source 101-104 and is also both flexible and extensible. The UMF is flexible in that selected contents from the original media source may be included or excluded in the resulting UMF 106 and selected content from the original media resource may be transformed to a different compatible format in the UMF. The UMF 106 is extensible in that additional content may be added to the original UMF and company proprietary extensions may be added in this manner. The flexibility of the UMF 106 permits the storing of other forms of data in addition to media resource related content.

The functions of both the UMC 105 and the UMF 106 are encapsulated in the unifying system and framework UMA 107. The UMA 107 architecture supports processing requests for UMC 105 media archive extractions, media archive conversions, UMF 106 generation, playback of UMF 106 recorded conferences/presentations/meetings, and so on. The UMA 107 provides other related services and functions to support the processing and playback of media archives. Examples of UMA 107 services range from search related services to reporting services, as well as other services required in software architected solutions such as the UMA 107 that are known to people skilled in the art. Additional details of the UMC 105, the UMF 106, and the UMA 107 follow in the following further detailed descriptions.

In one embodiment, each of the components UMC 105, UMF 106, and UMA 107 can run as a separate programming module on a separate distributed computing device. In an embodiment the separate computing device can interact with each other using computer networks. Alternatively the components UMC 105, UMF 106, and UMA 107 can be executed as separate processes executed on one or more computing devices. In another embodiment, the various components UMC 105, UMF 106, and UMA 107 can be executed using a cloud computing environment. In one embodiment, one or more components UMC 105, UMF 106, and UMA 107 can be executed on a cloud computer whereas the remaining components are executed on a local computing device. In one embodiment, the components UMC 105, UMF 106, and UMA 107 can be invoked via the internet as a web service in a service oriented architecture (SOA) or as a software as a service (SaaS) model.

Figure 2:
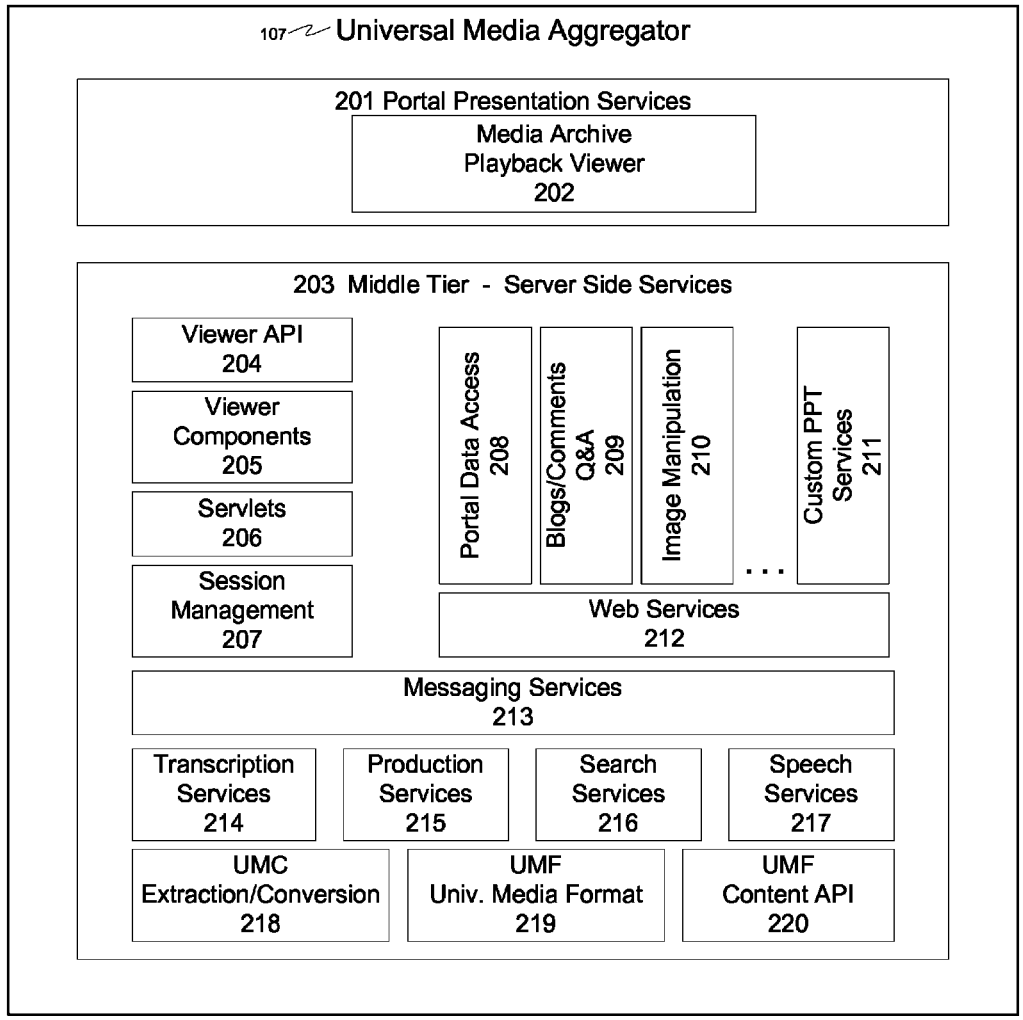
FIG. 2 is a block diagram that illustrates one embodiment of a universal media aggregator system and related programming modules and services including the universal media convertor and the universal media format.

FIG. 2 depicts the modules that when combined together, form the unifying system and framework to process media archives, namely the UMA 107. It is understood that other components may be present in the configuration. Note that the UMC 105 is depicted as residing in the UMA 107 services framework as UMC extraction/conversion services 218.

Note also that the UMF 106 is depicted in the UMA 107 services framework as UMF universal media format 219. The portal presentation services 201 of the UMA 107 services framework contains all of the software and related methods and services to playback a recorded media archive, as shown in the media archive playback viewer 202. The media archive playback viewer 202 supports both the playback of UMF 106, 219 as well as the playback of other recorded media formats. The UMA 107 also comprises a middle tier server side 203 software services. The viewer API 204 provides the presentation services 201 access to server side services 203. Viewer components 205 are used in the rendering of graphical user interfaces used by the software in the presentation services layer 201. Servlets 206 and related session management services 207 are also utilized by the presentation layer 201.

The UMA framework 107 also provides access to external users via a web services 212 interface. A list of exemplary, but not totally inclusive, web services are depicted in the diagram as portal data access 208, blogs, comments, and question and answer (Q&A) 209, image manipulation 210, and custom presentation services, e.g., MICROSOFT POWERPOINT (PPT) services 211. The UMA 107 contains a messaging services 213 layer that provides the infrastructure for inter-process communications and event notification messaging. Transcription services 214 provides the processing and services to provide the "written" transcripts for all of the spoken words that occur during a recorded presentation, conference, or collaborative meeting, etc. thus enabling search services 216 to provide the extremely unique capability to search down to the very utterance of a spoken word and/or phrase. Production service 215 contains all of the software and methods to "produce" all aspects of a video presentation and/or video conference. Speech services 217 is the software and methods used to detect speech, speech patterns, speech characteristics, etc. that occur during a video conference, web conference, or collaborative meeting, etc. The UMC extraction/conversion service 218, UMF universal media format 219, and the UMF content API 220 will be each subsequently covered in separate detail.

Figure 3:
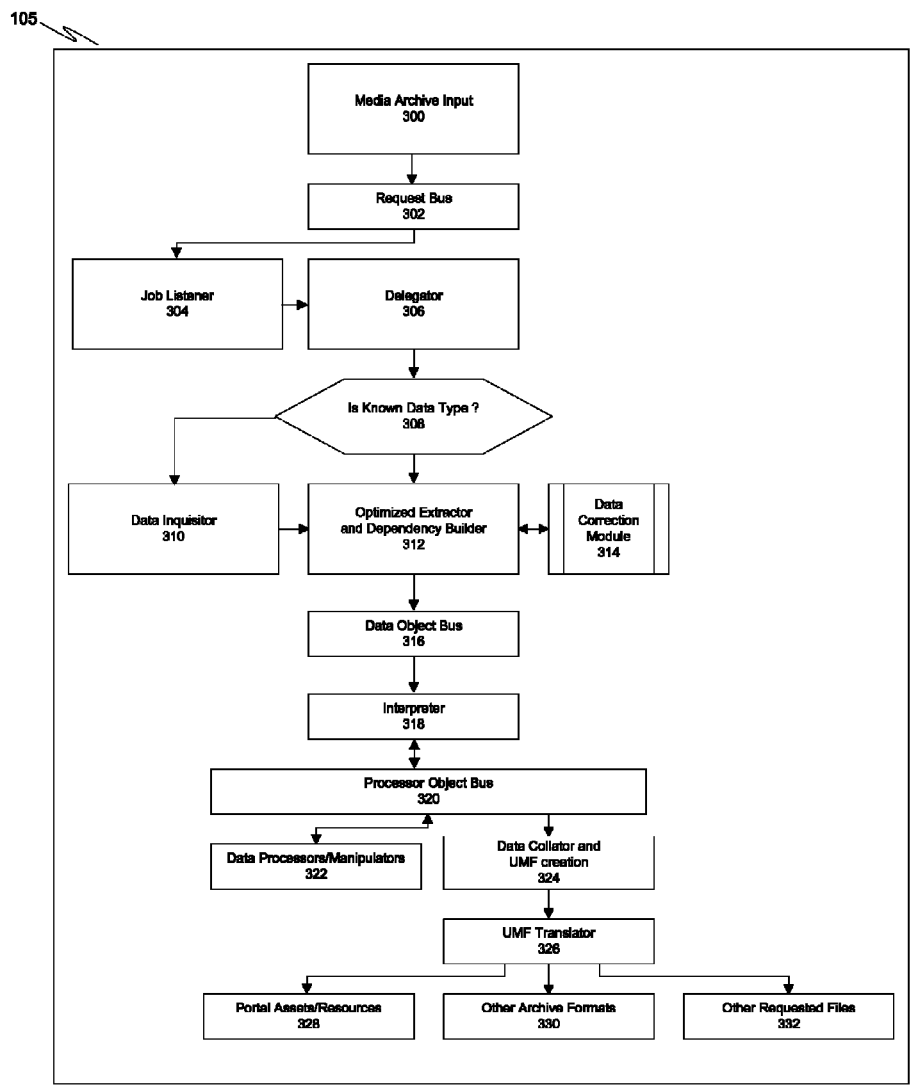
FIG. 3 is a diagram that illustrates one embodiment of modules within the universal media convertor and the interactions between these modules.

The diagram in FIG. 3 illustrates one embodiment of a processing flow of the major software components of the UMC media extractor/converter 218. The processing starts with media archive input 300. Refer to FIG. 1 media sources 101, 102, 103, and 104 for representative examples of media archive input. The media archive input can be in the form of web input, desktop application input, file input, data stream input, and similar well known input forms. The request bus 302 is a queue that contains the media archive input requests. The job listener 304 monitors items on the request bus 302 queue and pulls items from the queue that are jobs to process media archives and passes these jobs to the delegator 306. The delegator 306 is configured to determine if the input media archive is of a known data type 308 and then to delegate accordingly to either the data inquisitor 310 for unknown resource types or to optimized extractor and dependency builder 312 for known resource types. Data correction module 314 provides fix-ups for detected deficiencies in presentation slides and provides for synchronous corrections to prevent jitter during the playback phase of a recorded presentation. Further details on the UMC extractor 312 and the associated automated data correction 314 are provided in FIG. 4 and accompanying description.

The function of the data inquisitor 310 is to interrogate the contents of the media archive and determine if the UMC 105 is configured to support the types of media resources that are contained in the media archive 300. If the data inquisitor 310 detects supported media resources (e.g., moving picture expert group's (MPEG) MPEG-1 Audio Layer 3 (MP3), MPEG-4 (MP4), WINDOWS media video (WMV), audio video interleave (AVI), etc.) then corresponding objects to handle the extraction are created for use by the UMC extractor 312, updates the delegator 306 with information for the known media resource type, and then passes the request 300 to the UMC extractor 312 for processing. Errors are logged and the processing of the request is terminated when the data inquisitor determines that the UMC extractor 312 is unable to process the contents of the media archive 300.

The UMC extractor 312 is configured as described herein. The UMC extractor 312 creates an index for each of the media resources that are contained in the media archive. The index contains information identifying the type of resource and the start and end locations of the given resource within the contents of the media archive 300. The UMC extractor 312 uses a new and inventive process to determine content in the media archive that is in an unknown (proprietary) format and to created identifiable media resources from this data for subsequent storage in the UMF 106, 324. This secondary processing phase of the UMC extractor 312 utilizes the data correction module 314 to "fix up" the data that is discovered in the supplemental extra data in a media archive.

Figure 4:
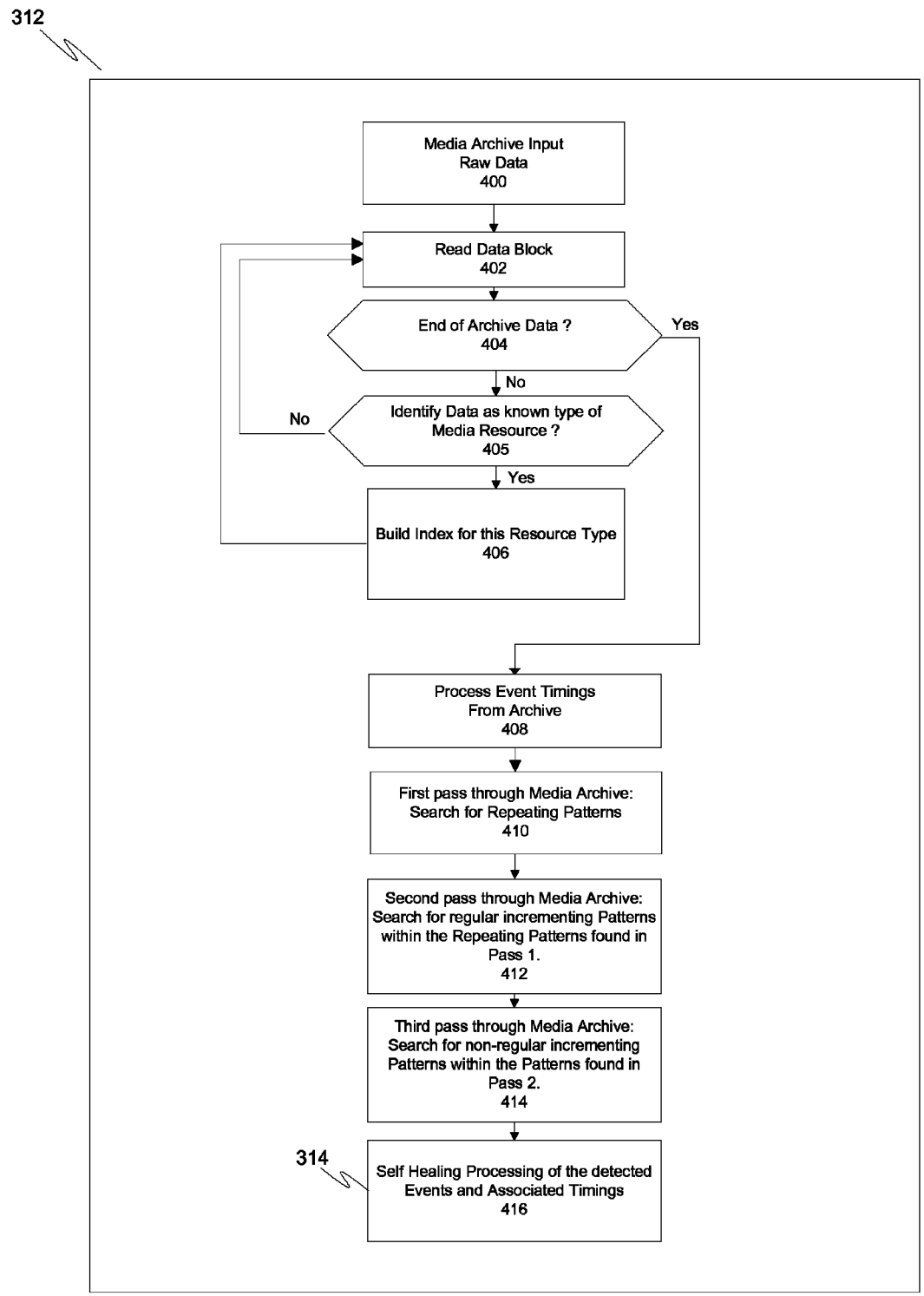
FIG. 4 is a flowchart illustrating an embodiment of operations of a media archive extractor for a universal media convertor module.

Additional details for the supplemental media archive data are documented in FIG. 4 and the associated textual functional description. A dependency list is built for the discovered media resources. This ordered list of media resources and the index information for all extracted media resources are then passed to the data object bus 316 via a queuing mechanism. The interpreter 318 is configured to process decisions based on the information that is supplied from the data inquisitor 310 and the extractor 312. The interpreter 318 monitors the queue of the data object bus 316 and pulls objects of the queue if it is determined that the interpreter can process the data in the object via one of associated media resource data processors 322. The interpreter 318 is configured to perform complex tasks that include scheduling, processing, and performing corrections of media resources, which are further described in FIGS. 5 and 6 and their associated descriptions. Once the interpreter 318 determines that all of the tasks to process the media archive request are completed, the interpreter 318 then queues the resulting output to the processor object bus 320. The data collator and UMF creation process 324 monitors the queue of the process object bus 320 and retrieves the completed media archive requests.

The completed data associated with the media archive request is then transformed into the UMF 106 via the methods contained in the data collator and UMF creation process 324. Once the UMF 106 is created then these resources are made available to the portal assets/resources 328 for use in applications running in the presentation services layer 201. The created UMF 106 can also be transformed to other archive formats 330 or other requested file formats 332 via the UMF translator 326. Further details on the UMF 106 creation and the UMF 106 storage description are described with respect to FIG. 7 and the accompanying text. Further details on accessing the contents of the UMF 106 are contained in FIG. 8 with accompanying textual description.

Turning now to FIG. 4, it describes one embodiment of processing steps that occur in the optimized extractor and dependency builder 312. Processing steps 400 through 406 illustrate how the UMC extractor 312 extracts well known media resource types from the media archive. Examples of well known media resources include, but are not limited to, the following formats: WAV, AVI, MP3, MP4, MPEG, PPT, etc. The extractor performs operations on the media archive raw data 400. The process of extracting the well known media resources from the media archive 400 start with reading a data block from the media archive 400, and if not at the end of input data 404, then proceeds to the interrogation step 405 to determine if a well known media resource type is found in the data. The data block is examined by comparing the patterns in the data block to typical patterns in various formats of media resources. The comparison can be accomplished via any well known means (e.g., performing boolean and operation, boolean or operation, or boolean exclusive or operation on data) or via other well known tools such as regular expression comparison tools (for example, REGEX). If the examination of the data block 405 determines that the format of the data in the data block 405 is of a known media resource type, then an index is built 406 for the found media resource comprising a data structure that identifies the position of the media resource within the media archive 400. The index for each detected media resource includes both the starting and ending location of the media resource within the media archive 400.

This process of reading data blocks 402 and interrogation of the data block via an introspection process continues until all of the data in the media archive 400 is sequentially processed and the end of the archive check 404 evaluates to true. If the end of the archive data is reached, the supplemental, non-standard, data is extracted 408 from the media archive 400. The process of finding meaningful media resource data from the supplemental data in a media archive requires multiple passes through the data, where each pass through the data adds new information based on the information collected in previous passes. It is not required to pass through the entire contents of the media archive 400 in steps 410 through step 414. Searching through the supplemental data is optimized since all of the index locations in the media archive 400 identified in step 406 can be bypassed.

In the first pass 410 through the supplemental data, the UMC optimized extractor code 312 searches for repeating patterns in the data. An example of a repeating pattern identified in the first pass, is a pattern like x02F0 that would be repeating throughout this supplemental data block. In another embodiment, the types of patterns searched in the first pass include clear text ASCII keywords that repeat throughout the supplemental data block, e.g., "Page", "Slide", "Event", etc. In an embodiment, a sequential scan of all of the supplemental data is performed in the first pass to identify patterns. From the results of this pattern identification, a matrix is developed, where the matrix includes: the pattern identifier, number of occurrences, and the locations (e.g., binary offset from beginning of file) of the occurrences in the supplemental data. Once these initial patterns are detected, then the second pass 412 through the supplemental data is searching for "regular" incrementing or decrementing patterns within a close proximity to the repeating patterns that were detected in the first pass 410 through the supplemental data. The identification of regular patterns is performed similar to the sequential scan mechanism described above for identifying patterns. In an embodiment, the close proximity is a configurable parameter, e.g., 128 bytes, but in practice this value could be larger or smaller.

These regular occurring patterns are associated with "human driven" events, e.g., they may correspond to MICROSOFT POWERPOINT slide numbers or the progression of slide flips that occurred within the recorded conference, meeting, or presentation. In an embodiment, a video associated with a presentation can be analyzed to identify a slide flip by identifying a change in a portion of the image associated with the slide projection. The slide flip identified in the video is a human driven event that can be utilized as a regular pattern. In another embodiment, an audio or a transcription of the audio associated with a presentation can be analyzed for regular events for example, the speaker speaking "next slide please."

The third pass 414 through the supplemental media archive data now searches for "non-regular" incrementing patterns in the locations in close proximity to the previously detected data patterns. Non-regular patterns do not occur on set intervals (the interval may be time code based, or based on the amount of data stored between pattern occurrences). The time code is a timing value that is detected in the media archive in close proximity to the media resource, and the associated detected regular pattern (if found). The time code timing value, has the characteristic of always incrementing in larger increments (e.g., in milliseconds), for example, greater than one or two, and may be bounded by the total length of time of the detected audio file from the archive. Set interval indicates the human events type of interval, e.g., a slide flip or a slide number where the detected intervals are small integers. The integer values for these "set intervals" may be stored in, and detected in, a byte, integer, long, etc. The non-regular patterns that are identified are the patterns that have the property of proceeding in an incrementing manner. The recognition of non-regular patterns is performed using steps similar to those described for repeating or regular patterns with the exception of searching for the properties associated with the non-regular data patterns.

Regular incrementing patterns are values that fall within a range, e.g., where the range is the number of pages in a POWERPOINT presentation. Further sanity checks on the possible meaning for a detected regular pattern can be applied, e.g., there are not likely to be thousands of slides within a one hour POWERPOINT presentation. The non-regular numbers may be time values in milliseconds granularity and therefore very large numbers outside of the range of the number of slides from the example POWERPOINT presentation. Therefore, using these types of inferences, human generated events (e.g., POWERPOINT slide flips) are distinguished from computer generated events such as recording time stamps in milliseconds. These non-regular numbers may appear to be random in nature, but will notably be progressing ever larger. This type of detected non-regular, repeating, seemingly random, continually incrementing, patterns are determined to be timing values that are associated with the "human driven" events that were detected in the contextual pattern matching that occurred in the second pass 412. These detected timing values from the third pass 414 can be further validated to ensure that the timing occurs within the time range of the audio track from the media resource that was detected in process step 406. In the overall flow of processing described above, each pass has a smaller amount of data to analyze compared to previous passes.

In another embodiment, a media archive may contain a media resource representing the audio and video from an on-line (internet/intranet based or other form of public/private network based) meeting. Consider further, that the meeting has a number of attendees/participants/panelists/subject matter experts and that during the course of the meeting that one presenter may "pass the 'mic' (e.g., a virtual microphone)" between the speakers. Also, consider that the number of speakers for the virtual meeting have been identified and/or detected in the processing of the media archive. In this case, the first pass identifies the "pass the 'mic'" type of event, the second pass detects the integral speaker id's (e.g., the number within the range of speakers), and the third pass detects the timings for the speaker change event transitions.

In some embodiments, a specific pass may identify information in one media resource of the media archive but not in another media resource of the media archive. For example, assume there are two files F1 and F2 in the media archive. It is possible that the first and second passes detects information in file F1 but only the third pass detects information in file F2. For example, file F1 may represent a POWERPOINT presentation with "SLIDE 1," "SLIDE 2," annotations. File F2 is an audio file that does not have the "SLIDE 1," "SLIDE 2," annotations but has timing information based on the third pass. In this case, the information in the two files can be correlated via the timing information detected in the third pass. During playback, the timings associated with the file F1 are correlated with the file F2 by advancing to the appropriate time interval of the file F2 (the audio file).

In one embodiment, a matrix structure is built to hold the detected information from each pass. If a particular pass did not return any information, the matrix does not store any values for the corresponding positions. For example, if the second pass is performed and does not detect any regular pattern, the matrix structure does not store any values in the appropriate positions. In some embodiments, the third pass may detect information and store the corresponding information but the second pass may not detect any information. Typically, the matrix may contain information detected in the first pass and the second pass or information detected in the first pass and the third pass, or information detected in all three passes. In one embodiment, the first pass is always performed but the second and third pass may be optional. For example, the second pass may be considered optional if the associated data is absent. The third pass may be relevant depending on the type of associated media resource/event that is detected/discovered in the first pass.

In some embodiments, the timing values associated with the media files may be estimated by using interpolation. For example, if the timing information available in the media resource is too far apart and the regular incrementing pattern occurs relatively more frequently, the timing information corresponding to the regular incrementing patterns can be estimated (by interpolation) and added to the metadata. In this situation the non-regular incrementing patterns may be detected anywhere in the file and estimated for the locations corresponding to the regular incrementing patterns.

Once the requisite passes have completed, the result is that a new media resource with associated events and timings has been discovered in the supplemental data within a media archive. The new resource types are identified and made known to the system and are used for future identification 405 of data. These newly discovered media resources are able to be synchronously connected to all of the other media resources (audio, video, transcripts, etc.) in the media archive 400. For example, if the newly discovered media is a POWERPOINT presentation, then all of the slide flips, in the exact order in which they were presented, can now be synchronized with all of the other media resources (audio, video, transcripts) during the playback of the media event (conference, presentation, meeting).

In cases where an audio file is converted to textual representation via auto-transcription, the auto transcription process keeps the timings for each detected spoken utterance (word) and there is a correlation between the timing of the spoken word (that was auto transcribed) and the associated timing of the spoken word within the audio file. The similar is true for manually generated transcripts except that the timings are at a fragment granularity (e.g., a sentence) instead of for each spoken word.

The synchronization information is stored in the UMF. In an embodiment, this synchronization information is stored in the UMF in the events 726 block, e.g., the case where the event is a synchronization timing event. Details of how the data is represented in the UMF are provided below. In one embodiment, the information from the three passes is stored in the UMF, and correlations are performed on the fly with respect to the requested search criteria.

The following examples, illustrate cross referencing of media files based on synchronization information for the media resources. In one embodiment, an audio file is monitored, and speech recognition used, to determine when the speaker says something like, "Now viewing the following screen" indicating that the speaker is now transitioning to a screen sharing view. When the audio detects this type of pending transition, then a "smoothing factor" is applied to slowly/gradually transition the view from the speaker to the view of the computer display screen. Therefore, the interaction between the audio and video resources. The benefit here is that special effects can be introduced that were not originally intended in the original media resources (e.g., fade in/out) in order to improve the play back qualities of an originally recorded media presentation.

In another embodiment, the search capability of the spoken word (or phrase) is enhanced as follows. Consider that a user knows that he was able to attend the first 15 minutes of a presentation. Subsequently, the user chooses to search the presentation for some "topic or phrase of interest" that occurred within the first 15 minutes of the presentation. Likewise, the user could search for the occurrence of the same phrase in the section of the presentation beyond 15 minutes in order to determine if there was anything else on the topic that was covered during the part of the live presentation he was unable to attend. Or another example to search just the first 10 minutes of a set of presentations, etc. These search examples show the synchronization of media resources with other programmatic resources (like searching).

Figure 5:
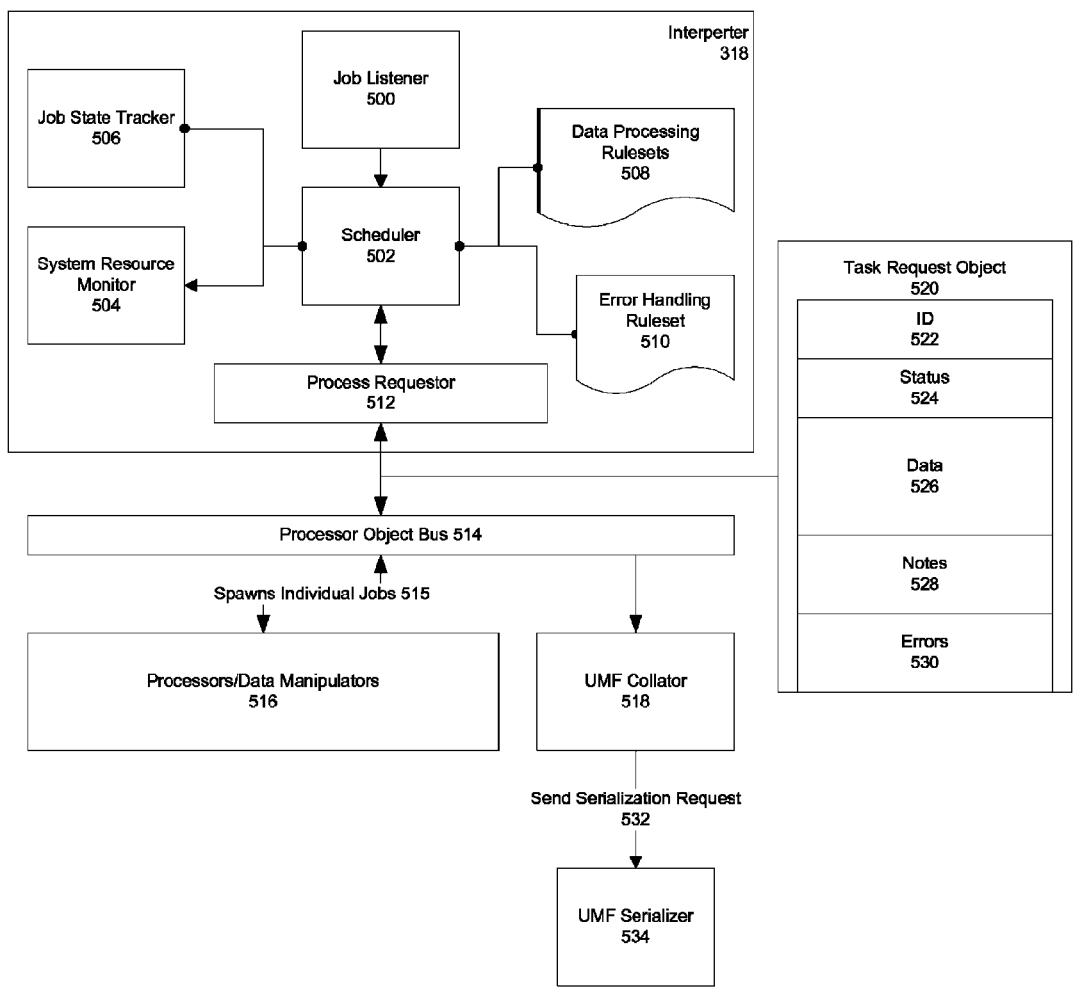
FIG. 5 is a flowchart illustrating an embodiment for processing of the universal media convertor interpreter.

Referring next to FIG. 5, it provides functional description of one embodiment of the UMC interpreter 318. A job listener 500 receives a request to process a media archive or other assets from a configured queue. This request is passed to a scheduler component 502 which retrieves the rulesets for processing the requested job from a data store (configuration file or database) 508. It initializes a job state tracker object 506 which will contain the state of the individual tasks which are required to complete processing of the job, and checks the system resource monitor daemon 504 for the available system resources (amount of free memory, central processing unit (CPU) utilization, and number of free CPU cores (a CPU core is a dedicated one-way processor within an n-way processor/processor group if on an SMP (Symmetric Multi-Processor) machine), as well as general input/output (I/O) state) to determine the number of parallel threads that the system is capable of running. Once the number of parallel threads has been determined, the scheduler 502 builds a hierarchy of tasks in the form of task request objects 520 based on their interdependencies (e.g., the output of one task may be the input of another), estimated runtime, and amount of resources consumed, etc.

The scheduler 502 notes the number of and type of tasks required to process the request in the state tracker object 506, sorting by order of processing and grouping by individual thread, and assigning each task a unique ID for tracking Once this registration is complete, the scheduler begins passing the individual task requests into the processor object bus 514 via a message passing interface known as the process requestor 512. The process requestor 512 is responsible for passing individual task requests into the bus, in the form of task request objects 520, and listening for responses from completed tasks. The individual task requests 520 take the form of object messages, each extending a parent task request object class, overriding data sections as needed so that each is identifiable as a specific object type, as well as having an embedded ID 522 as assigned by the scheduler 502 earlier.

Each individual processor/data manipulator 516 listens to the bus, inspecting objects to see if they can manipulate the object, and pulling objects off the bus if they can. Each processor/data manipulator 516 runs in its own thread. When a processor/data manipulator 516 completes processing or encounters an error, it stores the created data (or pointers to the data) 526, as well as any notes 528 or errors 530 encountered in the task request object, updates the status 526, and returns the task request object back to the bus 514 where it is retrieved by the process requestor 512 and returned to the scheduler 502 for inspection.

If any errors are reported, the scheduler 502 checks the error handling ruleset 510 in order to determine the next course of action, e.g., whether to spawn the next task, or stop processing. The task request 520 is stored in the state tracker object 506, and, if needed, additional processing is performed. The additional processing and error handling is described in detail in FIG. 6. This process of job request and response retrieval is looped until all specified tasks in the state tracker 506 are completed, or a critical error is reached. Once processing for the job has completed, a request to finalize the job is passed via the bus 514 in the form of the job state tracker object 506. A special listener, the UMF collator 518 listens for state tracker objects 506, retrieves them, and converts the object to a UMF object (See FIG. 7, 750). After the UMF object creation has been performed, a serialization request 532 is sent to the UMF serializer 534, whose operations are detailed in FIG. 7.

Figure 6:
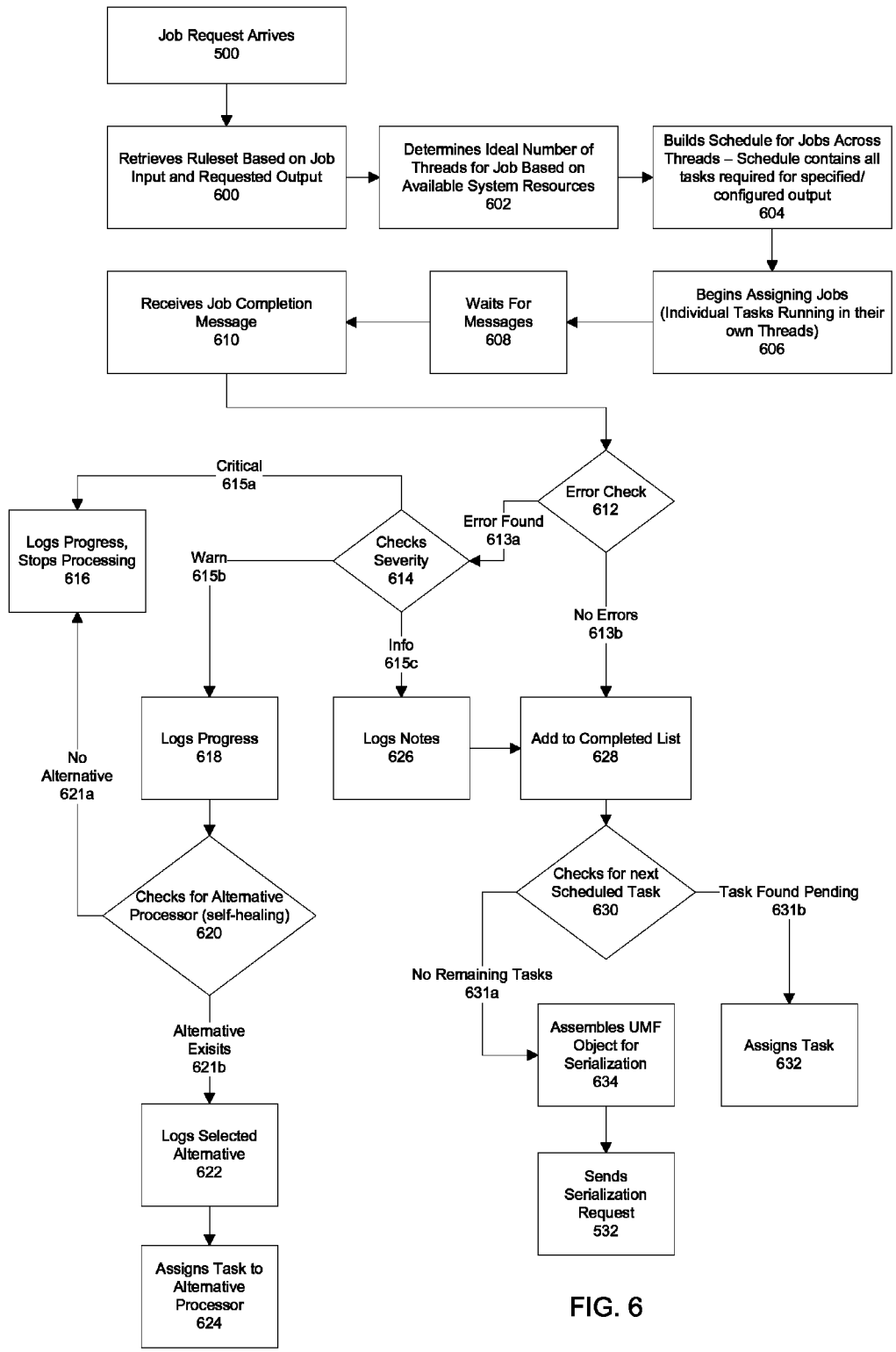
FIG. 6 is a flowchart illustrating an embodiment of operations of a universal media convertor module interpreter and associated process interactions.

Turning now to FIG. 6, it illustrates one embodiment for operations of the UMC interpreter 318 and its associated process interactions with other components of the UMC. A job request arrives 500 with a specified input and output and the interpreter 318 (FIG. 3) retrieves 600 the ruleset 508 based on the specified input and output for the job (e.g., the input for a requested job could be a web conference archive, and the output could be a video, with a separate audio file of the conference). Next the scheduler 502 determines 602 the ideal number of threads for the job based on the amount of available system resources as reported by the system resource monitor 504. Then the scheduler 502 builds 604 a schedule of specified tasks for distribution amongst the number of threads determined earlier. Taken into account are the interdependencies of the tasks (e.g., is the output of one task the input for another), the length of time estimated for each task, and other relevant data (e.g., will one task consume more memory than another leading to a slowdown in the process, or a potential out of memory condition). Once this schedule has been built, the scheduler 502 begins assigning 606 tasks by means of the process requestor 512, and then awaits 608 return messages from the individual tasks. The processors that are assigned these tasks are modules or programs which are required to convert or build the assets needed to complete a job request (e.g., a WAV to MP3 converter or a PPT slide to image converter).

Once a task completion message has been received 610, the scheduler 502 performs a check 612 of the return object 520 for any errors. If no errors are found 613*b*, the task is added to the completed list 628 contained in the job state tracker 506. Then the scheduler checks for the next scheduled task 630. If a task is found pending 631*b*, it is assigned 632, and the scheduler 502 waits for the next completion message 610. If no tasks are found to be remaining 631*a* the scheduler 502 assembles 634 the data from the state tracking object 506 into a UMF data object 750 and sends a serialization request 532 to the UMF serializer 534 (detailed operations for UMF serialization are in FIG. 7). If an error is encountered 613*a* during the error check 612, the scheduler checks 614 the severity of the error, and determines how to handle it based on the error handling ruleset 510. If the error is found 615*a* to be critical, e.g., processing cannot continue due to file corruption or lack of appropriate processor, the progress is logged 616, and the processing of the job halts. A message may be sent to a monitoring service or human supervisor in the event of a critical failure.

If the error is simply a set of information or messages concerning processing 615*c*, but the processor produced the desired output, the notes are logged 626 to the state tracking object 506, and the task is added 628 to the completed list. These notes may be useful during later quality assurance phases to alert a user that special attention may be needed when reviewing the final produced assets, or they may be useful during later analysis of the process to alleviate bottlenecks in performance of the system. If the error is found 615*b* to be a warning, e.g., the task could not be completed as requested, but an alternative may exist, or the desired output may not have been perfectly generated, the error is logged 618 to the state tracking object 506 and the scheduler 502 checks 620 for an alternative processor. If no alternative processor exists 621*a*, the scheduler 502 logs progress, and stops processing 616, in the same way as described for a critical error 615*a*. If an alternative processor does exist 621*b*, then the selected alternative is logged 622 and a new task is generated and assigned to the alternative processor 624. The scheduler 502 then returns to waiting for the next job completion method 608.

The process of selecting the best processor based on what is encountered during processing of individual tasks is an efficient way of executing self-healing techniques, in which the interpreter 318 ensures that the best processor for the job is selected, and in the event that the best processor cannot be used, the next best is tried, and so on, thereby guaranteeing that the best possible output is generated, as well as the completion of the job request in all but the worst case scenarios. An example of this would be the case where a particular slide from a PPT that was being processed contained corrupted data in it, and this data prevented the reading or writing of a PPT containing the corrupted slide, the corrupted slide would be isolated and the data corruption removed. The original state of the corrupted slide would be caught by the normal processor when it tried to read or write the file, and this would prevent it from continuing. When this error was returned, the alternate processor would be selected and would permit handling of the file. The reason for not selecting the alternate processor as the primary processor is often for performance reasons, as in most data cases additional error checking need not be performed on each segment of a file, and to do so would slow the processing time considerably. Selecting fallback processors on failure allows these edge cases to still be handled, while maintaining high performance throughout the majority of the process.

Figure 7:
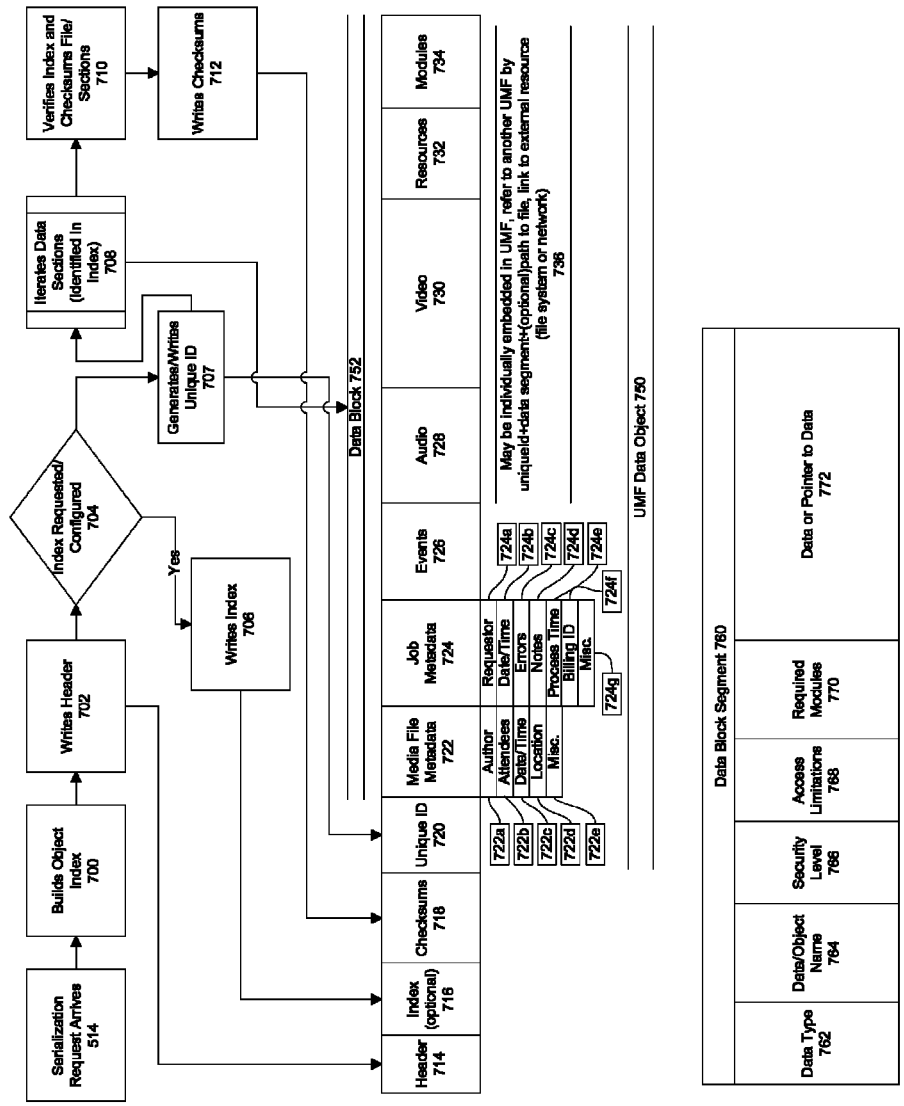
FIG. 7 is a flowchart illustrating one embodiment for creation of universal media format and related data storage format.

FIG. 7 describes in detail both the creation of a UMF 106 and also the structure of the UMF data format. A serialization request arrives 514 in the form of a UMF data object 750. The UMF serializer (FIG. 5, 534) first builds an index of the object 750, noting size of each object contained in the request, and the position (order and address) that each object will take in the created file or data stream. The recommended order of the data blocks is illustrated (left to right) in the data block 752. The UMF serializer 534 (FIG. 5) then opens a file stream and writes a file header 714 to the beginning of the stream 702. The header's 714 contents begin with the bytes (in hex) 0x554d467665722e ("UMFver."), and are followed by the UMF version number (e.g., "1.0.0.1"). This versioning allows the UMF to be intrinsically extensible so that different versions of the file format may at future times specify different requirements. If the container used for storing the UMF does not support binary data representations, and instead uses a wrapper around plain-text, the corresponding ASCII or UTF-8 values would be used instead. In XML, an example of the alternate storage of the header 714 information would be <UMF version="1.0.0.1">, as the top level element for the XML instance document. If the configuration of the serializer (FIG. 5, 534), or the request specifies that an index 716 is to be written 704, the index created in 700 is written to the stream. Index points are identified as "::IndexPosition: DataType:ObjectName:Address" and are padded by "_" if needed. If serialized to xml, the element is defined as <index position="" dataType="" objectName="" address=""/>. These index addresses will be verified and, if necessary, corrected later 710.

While an index greatly speeds retrieval from a large UMF, the presence of an index requires its maintenance for it to be useful, and if a particular UMF will be undergoing lots of future manipulations and edits it is possible to store the UMF without this index to save write and modification time overhead. Further, due to the extensible nature of the UMF format an index block can be added at a later point when the need for an index is identified. Requisite null values are then serialized to the checksums block 718 as a placeholder for the checksums that will be computed later in the process 712. Several types of data integrity checks may be alternatively used for checksum 718 and the size of the placeholder is dependent upon the chosen data integrity algorithm. After reserving the checksum block 718, the serializer 534 (FIG. 5) generates and writes a unique identifier (ID or id) 707 to the unique ID block 720. The unique ID may be registered in a data store of some format through well understood processes of cataloging unique ids, and the process may check with this data store after generation to ensure the uniqueness of the id.

After the unique ID generation 707, the process continues by iterating over each index point stored in the index previously generated 700 and serializing each segment 700 in the order specified by the index. Each of the individual components (720-734) of the data block 752 is written to the file if found, with their type 762 and name 764 serving at the beginning of the relevant block. This serves as the individual identifier for the media resource that is stored in the UMF. This is followed by the security level of the segment 766. This security level is a standard integer from 1-10, the specified level indicating that access should only be allowed by a client possessing an equal or lower security level. If there are any other arbitrary access limitations 768, these are serialized next. These access limitations 768 may be, but are not limited to: a specific geographic locale, or a specified department/group.

After the access limitations 768, pointers or URLs to any modules that are required for access or manipulation of the data block are written 770. The specified modules 770 would be useful if a custom encryption algorithm were used to store the data segment 772, or in the event that the data 772 could not be accessed without a specific form of digital rights management (DRM). Finally the data itself or a pointer to the data is written 772. Concerning the data segments 760 the following may be noted: 1) there is no arbitrary restriction on the number of instances of each data type stored in the UMF, or the number of data blocks, e.g., there could be more than one audio block 728, or multiple sets of resources 732. 2) The raw data need not be contained in the file itself 772; a pointer to another UMF in the format of "umf://uniqueid/segmentname [@location]" (@location is optional as a system could possess a preconfigured store for UMFs) or a file or network path (in URL format) would be sufficient. This allows, amongst other possibilities, for potential external storage of UMF data, or creation of a UMF where direct access to the data is not possible.

A non-inclusive list of potential data to be stored in the UMF is as follows: (1) Any metadata concerning the media file 722, e.g., the author 722a, any attendees 722b that were present if the media file originated from a meeting or conference, the date and time of the original recording 722c, the location 722d of the recording (geographic and/or virtual), and any other misc. data 722e. (2) Any metadata extracted from the original job request and processing, e.g., the original job requestor 724a, the date and time of the request 724b, and errors encountered while processing 724c, and notes made by the processor 724d, the amount of time that processing the request took 724e, any external billing ID(s) 724e, and any other miscellaneous data 724g. (3) Any events 726 associated with the data contained in the UMF, e.g., a change in presenter if a presentation was being recorded, a change in context of the data, e.g., video and audio combined to audio only at a certain time code, or something as simple as a change in page if a portable document format (e.g., ADOBE PDF) or MICROSOFT POWERPOINT was being presented. (4) any segments of audio 728 processed as a part of the job, e.g., WAV data, MP3, etc., 5) any video segments 730. (5) Any additional resources 732 related to the data. e.g., POWERPOINT files, WORD documents, images, etc. (6) any code modules 734 related to or required for access or manipulation of UMF. Examples of these modules 734 could be, but are not limited to, DRM plugins, usage trackers, security information or decryption packages if the data contained in the UMF were encrypted, executable players for various platforms, dynamic code generators for various platforms related to playback or access of the data, etc. The ability to include code in the UMF format allows a recipient to process a media archive without having to download additional logic. Custom designed media archives and new media sources can be easily developed and incorporated in UMF and provided to consumer systems for being processed.

Figure 8:
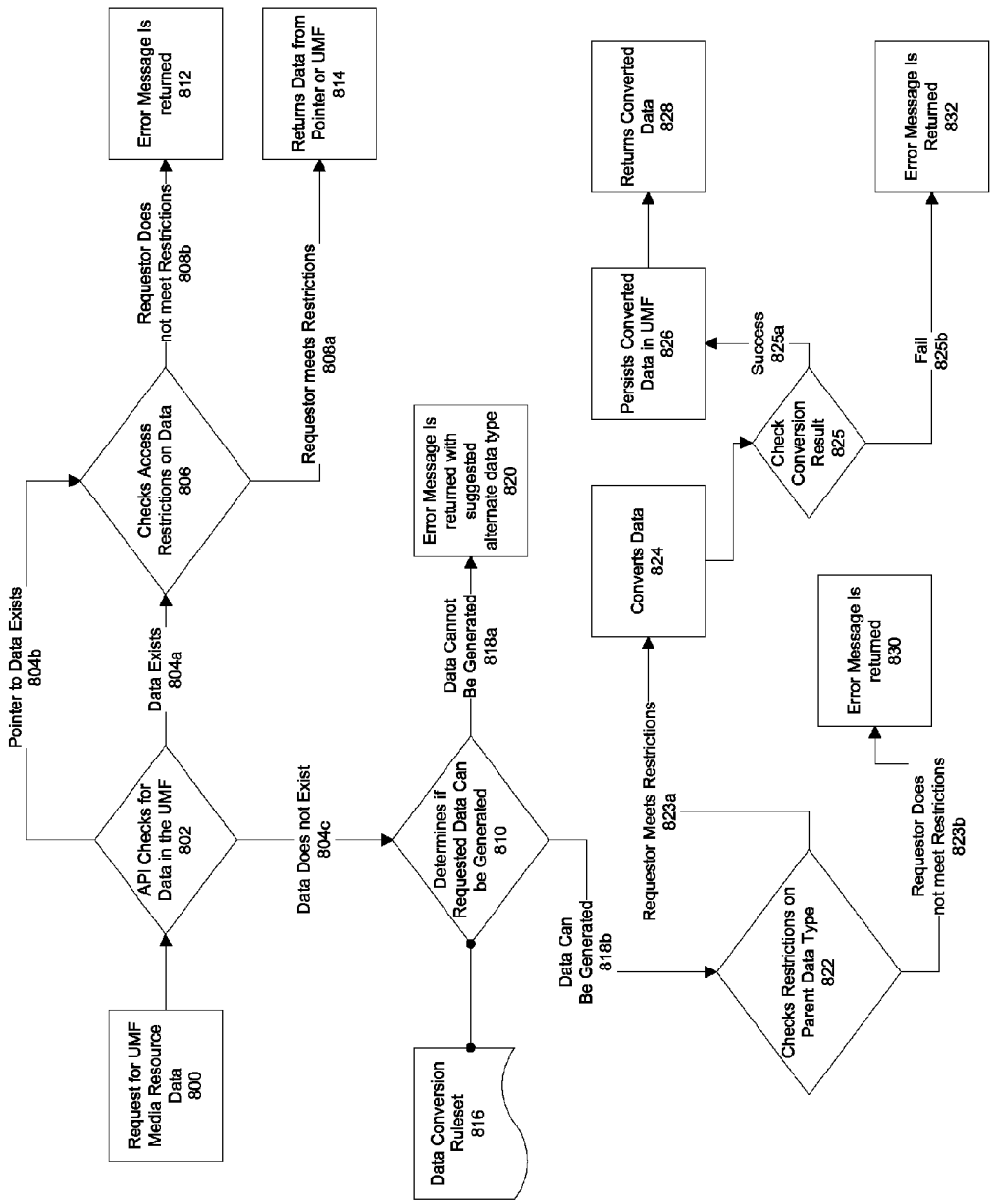
FIG. 8 is a diagram that illustrates one embodiment for access of universal media format resources via an application programming interface (API).

FIG. 8 provides the detailed flow of accessing the UMF 106, 219 via an API 220 that is provided via the UMA framework 107. A request 800 is made via the UMF content API 220 to retrieve data that is contained in a UMF archive. The API checks the requested UMF to ensure it contains the requested data 802. This request must contain the UMF unique ID 720 and the requested data type 762, and may contain the name of the requested data type 764. The request should also contain some form of authentication data in any of the variety of well understood authentication mechanisms (lightweight directory access protocol (LDAP), username/password pair, etc.) so as to identify the system or user initiating the request. If a pointer to the data exists 804b, or the data itself exists 804a, in the data storage section 772 of the requested data block of the UMF, the system then checks for any access restrictions on the requested data segment 806. These are stored in the relevant data block segment 766,768, 770. If the requestor does not possess the required credentials to meet the specified restrictions 808b an error message is returned 812 stating that the request has been denied due to lack of sufficient privileges.

If the requestor does meet the specified restrictions 808a, then the data or a pointer to the data is returned 814. It is possible for the API to act as a proxy for data that is merely referenced, and if requested in a particular way (e.g., with a boolean argument specifying whether or not the API should act as a proxy), to return the data itself, even if the data is merely referenced by pointer in the UMF. If the requested data does not exist 804c, the API checks a data conversion ruleset 816, to determine if the requested data can be generated 810 and returned to the client. The data conversion ruleset 816 comprises mappings of dependencies for the creation of a given data type (e.g., a WAV or other audio file is required to generate an mp3), as well as suggested alternatives if a conversion cannot be performed. The ruleset 816 also provides the location (if web service) of executable code (for example, binary code) or name of the module to be used for the conversion. If the ruleset 816 does not define a means for generation of the requested data type 818a, an error is returned 820 that states that the requested data could not be generated. If possible, a suggested alternative data type is returned that is either present in the system or can be generated as specified in the data conversion ruleset 816.

If the data can be generated 818b, the API checks the restrictions of the parent data type that will be used to generate the data 822 (thus the generated data inherits the permissions/restrictions of the data it is being generated from). If the data is being generated from two or more data types (e.g., generating a video from a set of POWERPOINT slides and an audio file) the more restrictive restrictions are used. If the requestor does not meet the restrictions 823b an error message is returned 830 that states that the request has been denied due to insufficient privileges. If the requestor meets the access restrictions 823a, the API requests from the conversion utility specified in the data conversion ruleset 816 that the conversion be performed. Then the API checks the results of the conversion 825. If the conversion failed (i.e. because of corrupted source data, or incompatible codecs) 825b an error message is returned that specifies that an error was encountered while attempting to convert the data 832. If the conversion was successful 825a the converted data is added to the UMF 826 in the form of an additional data block segment 760 and the converted data is returned 828.

In summary, methods and systems disclosed provide a significant improvement to the ways in which media archive files are processed, namely the UMC 105. The methods preserve the synchronous attributes from the original media resources and provide a flexible and extensible storage mechanism, namely the UMF 106. The UMF 106 both represents media resources and also provides the capability to store executable code that can perform additional processing on the same UMF 106 media resources. All new additions and/or modifications to the UMF 106 are handled in a synchronous context in relation to all of the other media resources. The unifying system and framework, namely the UMA 107, provides a comprehensive set of services and functions to perform processing operations on media archives, produce media resources, and to provide the services to playback the contents of media archives in a synchronized manner.

The following is an example description of the synchronous playback of a presentation: the text in the scrolling transcript window, is synchronized with the audio and video of the presenter, as well as synchronized with the POWERPOINT slides, chat window, screen sharing window, or any other displayable media resource. Likewise, the UMA 107 provides other useful services that take advantage of the synchronous processing of the UMC 105. Perhaps the most notable feature is the UMA search services 217 that allow a "synchronous search" down to the spoken word or phrase in a presentation. This is noted as a "synchronous search" because when the search criteria are found, all of the other corresponding media resources are synchronized together in the playback view of the presentation. For example, the resulting search for a word or a phrase spoken in the presentation then presents a view to the user with the text in the scrolling transcript (corresponding to the search criteria), which is instantaneously synchronized with the audio and video of the presenter, as well as with the POWERPOINT slides, chat window, or any other displayable resource.

There are numerous uses cases that provide new and useful advantageous features and functions when coupled with the use of the systems and methods for the UMC 105, UMF 106, and the UMA 107. Some example use cases are provided herein.

In one embodiment, users are allowed to make annotations to the media files of the media archive. The annotations can be associated by the user with events associated with the media archive. Annotations can be made with respect to a particular media file, for example, a file representing a slide presentation. However, synchronization of the various media files allows the annotations to be accessible from other media files. For example, a user can search for certain terms in an audio file associated with the slide presentations. The search returns portions of the audio file that occur near the search terms. Synchronization of the two media files allows the search results to be presented with portions of the slide presentation associated with the portions of the audio file presented to the user. Relevant annotations added to the slide presentation can be presented to the user along with the portions of the slide presentation presented to the user as a result of the search. Therefore, relevant annotations made to a particular media file of the archive can be presented to a user with portions of another file of the media archive. As an example, the user searches for a term "California." Assume that the term "California" was mentioned in the audio file associated with a presentation. The search determines the portion of the audio file (possibly based on a transcription of the audio file) associated with the search term. Synchronization of the media files helps determine that the relevant portions of the audio file correspond to slide 12 of the presentation. The slide 12 of the presentation can be presented to the user along with the portions of the audio file as well as any annotations made to the slide presentation associated with slide 12.

In an embodiment, synchronization of media files allows user to narrow down searches. In the above example, a user can search within an audio file of the media archive wherein the search for the term "California" is restricted to portions of the presentation between slides 10-20. The search in a first media file can be restricted based on a criteria that is defined based on a second media file. The synchronization of the two media files allows the relevant portions of a first file to be defined based on restricted portions of a second file.

Computing Machine Architecture

Figure 9:
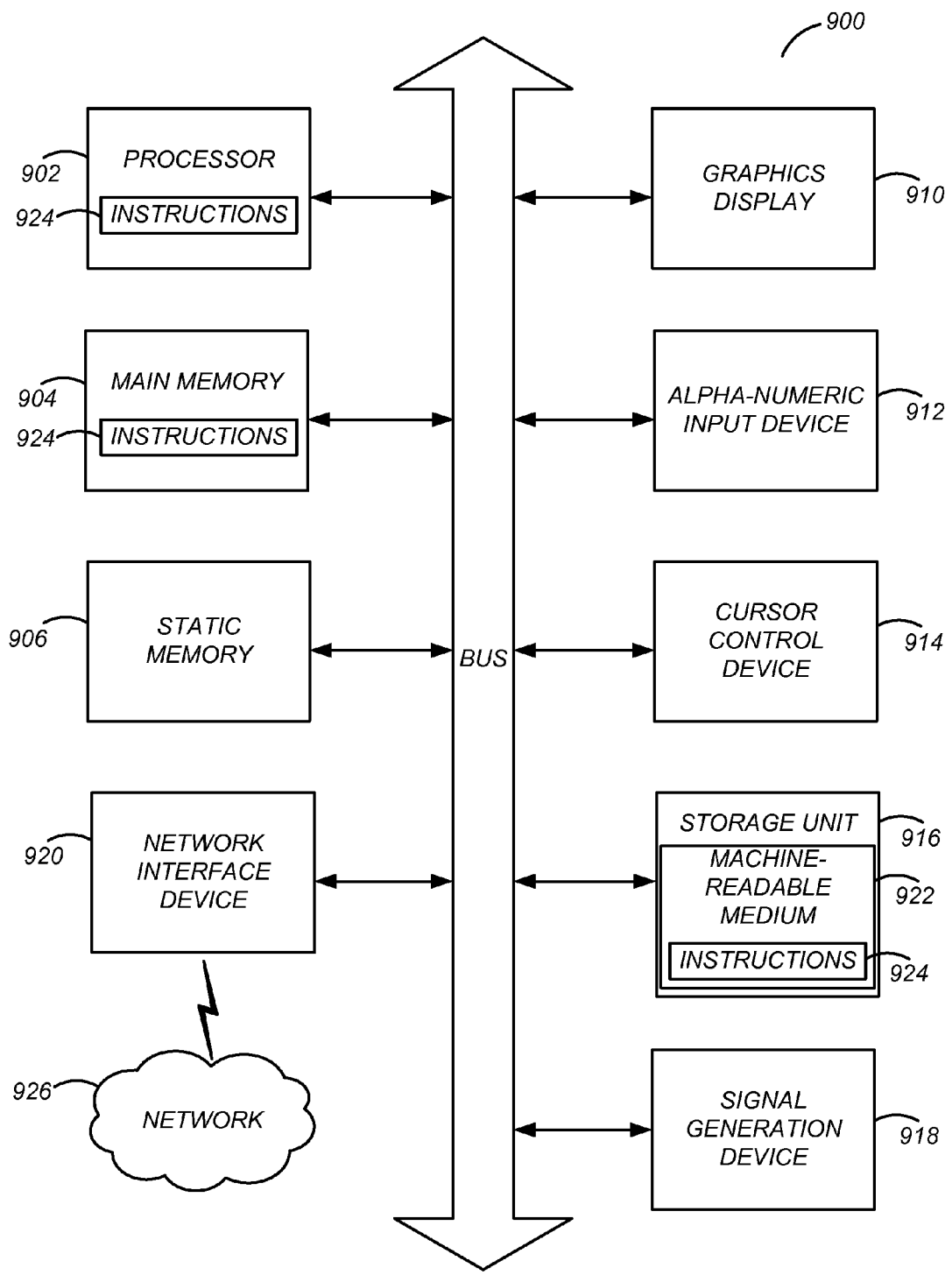
FIG. 9 illustrates one embodiment of components of an example machine able to read instructions from a machine-readable medium and execute them in a processor (or controller).

One embodiment of the disclosed systems and processes described herein are structured to operate with machines to provide such machines with particular functionality as disclosed herein. FIG. (FIG. 9 is a block diagram illustrating components of an example machine configured to read instructions from a machine-readable medium and execute them through one or more processors (or one or more controllers). For example, the machine illustrated in FIG. 9 can be used to execute one or more components UMC 105, UMF 106, and UMA 107. Specifically, FIG. 9 shows a diagrammatic representation of a machine in the example form of a computer system 900 within which instructions 924 (e.g., software) cause the machine to perform any one or more of the methodologies discussed herein when those instructions are executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

It is noted that the processes described herein, for example, with respect to FIGS. 3, 4, 5, 6, 7 and 8, may be embodied as functional instructions, e.g., 924, that are stored in a storage unit 916 within a machine-readable storage medium 922 and/or a main memory 904. Further, these instructions are executable by the processor 902. In addition, the functional elements described with FIGS. 1 and 2 also may be embodied as instructions that are stored in the storage unit 916 and/or the main memory 904. Moreover, when these instructions are executed by the processor 902, they cause the processor to perform operations in the particular manner in which the functionality is configured by the instructions.

The machine may be a server computer, a client computer, a personal computer (PC), a desktop computer, a laptop computer, a notebook, a tablet PC, a set-top box (STB), a personal digital assistant (PDA), a cellular telephone, a smartphone, an IPAD, IPHONE, a customized (application specific) embedded mobile computing devices, a web appliance, a network router, switch or bridge, server blade, or may reside in an specialized pluggable electronic card that is capable of insertion into the chassis of a computing device, or any machine capable of executing instructions 124 (sequential or otherwise) that specify actions to be taken by that machine. In an embodiment, the machine may be integrated with other commercially available (or special purpose) Audio/Video playback devices, or integrated with other commercially available (or special purpose) Networking and/or Storage and/or Network Attached Storage and/or Media Processing equipment (e.g., CISCO MXE, etc.), or integrated as a set of Object Oriented (or procedural) statically or dynamically linked programming libraries that interface with other software applications.

Further, while only a single machine is illustrated, the term "machine" shall also be taken to include any collection of machines that individually or jointly execute instructions 924 to perform any one or more of the methodologies discussed herein.

The example computer system 900 includes a processor 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include graphics display unit 910 (e.g., a plasma display panel (PDP), a liquid crystal display (LCD), a projector, or a cathode ray tube (CRT)). The computer system 900 may also include alphanumeric input device 912 (e.g., a keyboard), a cursor control device 914 (e.g., a mouse, a trackball, a joystick, a motion sensor, or other pointing instrument), a storage unit 916, a signal generation device 918 (e.g., a speaker), and a network interface device 820, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein, for example, the process illustrated and described with respect to FIGS. 3, 4, 6, and 8.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled,"

however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for processing of media archive resources through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method of processing data to synchronize a plurality of media resources, the method comprising:
    receiving a first media resource and a second media resource associated with events that occurred during a time interval, the first media resource representing content in a first media format and the second media resource representing content in a second media format;
    identifying a first sequence in the first media resource and a second sequence in the second media resource, each sequence comprising one or more of:
        a pattern comprising a repeating value, and
        a pattern comprising incrementing values, wherein each incrementing value occurs within a threshold distance of a corresponding repeating value;
    correlating elements of the first sequence with elements of the second sequence, wherein each pair of correlated elements is associated with an event that occurred in the time interval; and
    storing correlation information associated with the first sequence and the second sequence.

2. The computer implemented method of claim 1, wherein the regularly incrementing pattern occurs within proximity of a regularly repeating pattern, wherein a sequence of pattern is within proximity of another sequence if corresponding elements of the sequence are within a threshold distance of each other.

3. The computer implemented method of claim 1, wherein a sequence comprises non-regular incrementing values that occur at non-regular intervals.

4. The computer implemented method of claim 3, wherein the sequence of non-regular incrementing values occurs within proximity of a sequence of regularly incrementing values, wherein a first sequence is within proximity of a second sequence if elements of the first sequence are within a threshold distance of corresponding elements of the second sequence.

5. The computer implemented method of claim 3, wherein the non-regular incrementing values are timing values.

6. The computer implemented method of claim 5, further comprising:
    validating elements of the sequence of non-regular incrementing values by verifying that each non-regular incrementing value occurs within the time interval in which the events occurred.

7. The computer implemented method of claim 1, wherein storing correlation information associated with a sequence comprises storing locations of the elements of the sequence within each media resource.

8. The computer implemented method of claim 1, wherein the correlation information is used for presentation of a first portion of the first media resource along with a second portion of the second media resource, wherein the first and the second portions are associated with a same event.

9. The computer implemented method of claim 8, wherein the second portion is synchronized with the first portion and the presentation of the first portion of the first media resource along with the second portion of the second media resource comprises simultaneous playback of the first portion with the second portion.

10. The computer implemented method of claim 1, wherein the events that occurred during a time interval comprise at least one of a presentation, a screen sharing session, an online collaboration session, and a recorded media event.

11. The computer implemented method of claim 1, wherein the events that occurred during a time interval comprise a slide presentation and a sequence corresponds to slide flips in the presentation.

12. The computer implemented method of claim 11, further comprising:
    validating elements of the sequence by verifying that values corresponding to the elements are within a range of the total number of slides of the presentation.

13. The computer implemented method of claim 1, wherein the plurality of media resources are obtained from a media archive.

14. A computer implemented method of presenting data in a media archive comprising a plurality of media resources, the method comprising:
    receiving a request for presenting information available in a media archive associated with events that occurred during a time interval, wherein the media archive comprises a first media resource and a second media resource;
    identifying a first portion of the first resource for presentation based on a criteria available in the request;
    identifying a second portion of the second resource for presentation, wherein the second portion and the first portion are correlated with each other based on a first sequence in the first media resource and a second sequence in the second media resource, each sequence comprising one or more of:
        a pattern comprising a repeating value, and
        a pattern comprising incrementing values, wherein each incrementing value occurs within a threshold distance of a corresponding repeating value; and
    presenting the first portion along with the second portion.

15. A computer implemented method of claim 14, wherein the request comprises search terms to be identified in media resources of the media archive and the first portion comprises portion of the first media resource including at least a search term.

16. A computer implemented method of claim 14, wherein the request comprises information identifying an event that occurred during the time interval and the first portion comprises portion of the first resource associated with the event and the second portion comprises portion of the second resource associated with the event.

17. A computer implemented method of claim 14, wherein the request comprises search terms to restricted to portions of media resources of the media archive that correspond to one or more events that occurred during the time interval.

18. A computer implemented system for processing data to synchronize a plurality of media resources, the system comprising:
 a computer processor; and
 a computer-readable storage medium storing computer program modules configured to execute on the computer processor, the computer program modules comprising:
  a universal media convertor module configured to:
   receive a first media resource and a second media resource associated with events that occurred during a time interval, the first media resource representing content in a first media format and the second media resource storing content in a second media format;
   identify a first sequence in the first media resource and a second sequence in the second media resource, each sequence comprising one or more of:
    a pattern comprising a repeating value, and
    a pattern comprising incrementing values, wherein each incrementing value occurs within a threshold distance of a corresponding repeating value;
   correlate elements of the first sequence with elements of the second sequence, wherein the pair of correlated elements is associated with an event that occurred in the time interval; and
   store correlation information associated with the first sequence and the second sequence.

19. A computer program product having a computer-readable storage medium storing computer-executable code for processing data in a plurality of media resources to synchronize the media resources, the code comprising:
 a universal media convertor module configured to:
  receive a first media resource and a second media resource associated with events that occurred during a time interval, the first media resource representing content in a first media format and the second media resource storing content in a second media format;
  identify a first sequence in the first media resource and a second sequence in the second media resource, each sequence comprising one or more of:
   a pattern comprising a repeating value, and
   a pattern comprising incrementing values, wherein each incrementing value occurs within a threshold distance of a corresponding repeating value;
  correlate elements of the first sequence with elements of the second sequence, wherein each pair of correlated elements is associated with an event that occurred in the time interval; and
  store correlation information associated with the first sequence and the second sequence.

20. A computer implemented method of processing data to synchronize a plurality of media resources, the method comprising:
 receiving a first media resource and a second media resource associated with events that occurred during a time interval, the first media resource representing content in a first media format and the second media resource representing content in a second media format;
 identifying a first sequence in the first media resource comprising a pattern of regularly occurring values;
 identifying a second sequence in the second media resource comprising a pattern of incrementing values occurring at non-regular intervals, the incrementing values corresponding to timing values;
 synchronizing the first media resource with the second media resource based on elements of the first sequence and elements of the second sequence, the synchronizing comprising:
  estimating timing values corresponding to elements of the first sequence by interpolating timing values from the second sequence; and
 storing synchronization information correlating the first media resource and the second media resource.

21. The computer implemented method of claim 20, further comprising:
 validating elements of the non-regular incrementing pattern by verifying that values corresponding to the elements occur within the time interval in which the events occurred.

22. The computer implemented method of claim 20, wherein the first sequence comprises a pattern of regularly occurring identical values.

23. The computer implemented method of claim 20, wherein the first sequence comprises a pattern of regularly occurring incrementing values.

* * * * *